(12) United States Patent
Wright et al.

(10) Patent No.: US 9,352,676 B1
(45) Date of Patent: May 31, 2016

(54) VEHICLE SEATING ARRANGEMENT

(71) Applicants: Soctt D Wright, Oakland, MI (US); Richard E Power, Oxford, MI (US)

(72) Inventors: Soctt D Wright, Oakland, MI (US); Richard E Power, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/628,616

(22) Filed: Feb. 23, 2015

(51) Int. Cl.
*B60R 22/00* (2006.01)
*B60N 2/58* (2006.01)
*B60N 2/22* (2006.01)
*B60N 2/01* (2006.01)

(52) U.S. Cl.
CPC .. *B60N 2/58* (2013.01); *B60N 2/01* (2013.01); *B60N 2/22* (2013.01)

(58) Field of Classification Search
CPC ............... B60N 2/01; B60N 2/22; B60N 2/58
USPC ............. 297/224, 225, 226, 227, 228, 228.1, 297/228.11, 228.12, 228.13, 229, 481, 482, 297/248
See application file for complete search history.

(56) References Cited

U.S. PATENT DOCUMENTS

| | | | | |
|---|---|---|---|---|
| 2,575,548 A * | 11/1951 | Carter | ....................... | B60N 2/60 297/228.1 |
| 5,139,311 A * | 8/1992 | Imai | ......................... | B60N 2/58 297/481 |
| 5,158,339 A * | 10/1992 | Miyanaga | ............... | B60N 22/26 297/482 X |
| 5,785,381 A * | 7/1998 | Carter | .................. | B60N 2/6054 297/228.12 X |
| 7,104,570 B2 * | 9/2006 | Hearn | .................... | B60R 22/023 297/481 X |
| 7,275,786 B2 * | 10/2007 | Kobayashi | ............... | B60N 2/58 297/228.12 X |
| 7,458,636 B2 * | 12/2008 | Chen | ........................ | B60N 2/28 297/481 X |
| 7,686,392 B2 * | 3/2010 | Kenny | .................. | B60N 2/6018 297/228.13 X |
| 8,678,497 B2 | 3/2014 | Kyogoku et al. | | |
| 9,039,096 B2 * | 5/2015 | Nakanishi | ............... | B60R 22/18 297/481 |
| 2014/0110988 A1 * | 4/2014 | Nakanishi | .............. | B60N 2/688 297/481 |

* cited by examiner

*Primary Examiner* — Rodney B White
(74) *Attorney, Agent, or Firm* — Ralph E. Smith (57) ABSTRACT

A seat for a vehicle includes a seat base, a seat back, a pair seat anchors extending from lateral sides of the seat back, a pair of upper and lower side covers, and a pair of flexible wrap members. The upper covers and the lower covers are positioned about the lateral sides above and below the anchors, thereby providing an access space above and below each anchor. Each flexible wrap member is non-removably attached at a first end to the seat proximate a rear side of the seat back and is configured to extend around the respective upper and lower side covers from the rear side to a front side of the seat back so as to cover the access space and extend about the respective seat anchor while substantially conforming to an outer perimeter shape of the respective upper and lower side covers.

16 Claims, 8 Drawing Sheets

VEHICLE SEATING ARRANGEMENT

FIELD

The present application relates generally to vehicle seats and, more particularly, to a center seat for a vehicle seating arrangement, where the center seat includes seat anchors extending from the lateral sides thereof.

BACKGROUND

Today's vehicles are often equipped with multiple rows of vehicle seats, such as in minivans and sport utility vehicles (SUVs). One example such multi-row seating in a minivan includes a first row of seats for a driver and a passenger, a second row of seats behind the first row, and a third row of seats behind the second row. Often, the second row of seats includes two individual outboard seats, such as bucket seats or captain's chairs, with a space therebetween to provide access to the third row of seating. Optionally, a removable center seat is positioned in the space between the second row outboard seats to provide a bench-like second row seating arrangement.

Such a removable center seat is typically required to be narrower than the outboard seats, and thus optional seat anchors for attaching a child seat are positioned on outboard lateral sides of the seat. As these anchors project outwardly from the lateral sides of the seat, there is a desire to cover the anchors when not in use, while also providing access when needed to attach a child seat, for example. Known arrangements for covering such anchors include utilizing a plastic recliner cover assembly that includes a separately removable plastic anchor cover that covers and hides the seat anchors when assembled to the recliner cover. Such arrangements can suffer from numerous drawbacks, including plastic retention arrangements for the removable anchor cover that present potential durability concerns with repeated use, as well as the need to separately store the anchor cover when removed from the recliner cover. Thus, while such conventional anchor cover arrangements for second row center seats work for their intended purpose, there remains a need for improvement in the relevant art.

SUMMARY

In accordance with an aspect of the invention, a seat for a vehicle is provided. In one exemplary implementation, the seat includes a seat base, a seat back, seat anchors outwardly extending from respective lateral sides of the seat back, upper side covers, discrete lower side covers and a pair of flexible wrap members. The upper side covers are positioned about the lateral sides of the seat back above the respective seat anchor and in spaced relation thereto. The lower side covers are positioned about the lateral sides of the seat back below the respective seat anchor and in spaced relation thereto, thereby providing an access space above and below the seat anchor. The flexible wrap members are configured to, in a fastened position, extend about the respective seat anchors and around a portion of the respective upper and lower side covers to cover the access spaces. Each flexible wrap member is configured to, in the fastened position, substantially conform to an outer perimeter shape of the respective upper and lower side covers and, in an unfastened position, be at least partially removed from contact with the respective upper and lower side covers thereby providing access to the respective seat anchor via the uncovered access space.

In some implementations, the seat includes a recliner mechanism and the upper side covers comprise recliner covers positioned over the recliner mechanism.

In some implementations, the upper side cover and the lower side cover comprise plastic covers, and the flexible wrap members comprise one of a fabric wrap member and a leather wrap member consistent with a seat material covering at least a portion of the seat back.

In some implementations, the flexible wrap members each include an aperture aligned with an outer side of the respective seat anchors when the flexible wrap member is in the fastened position. In one exemplary implementation, each aperture is sized and shaped to match a size and shaped of outer sides of the anchors.

In some implementations, each flexible wrap member is non-removably attached at the first end to a back side of the seat back opposed to a front side of the seat back, and at the second end to the front side of the seat back via the fastening arrangement. In one exemplary implementation the front side of the seat back includes a recess where a first mating member of the fastening arrangement is positioned. The second end of the flexible wrap member includes a second mating member of the fastening arrangement for removably attaching the second end of the flexible wrap member to the first mating member.

In some implementations, a lower end of the upper covers and an upper end of the lower covers include a recessed portion constructed to receive and support the flexible wrap member in the fastened position and provide for outer surfaces of the upper cover, flexible wrap member and lower cover to be substantially coplanar on each lateral side of the seat.

In some implementations, each flexible wrap member comprises a discrete flexible support member coupled to the flexible wrap member and configured to aid the flexible wrap member in conforming to and maintaining the shape of the upper and lower covers. In one exemplary implementation, each flexible support member includes upper and lower portions that overlap the recessed portions of the upper and lower covers so as to provide support for the flexible wrap member when in the fastened position.

In some implementations, each flexible wrap member includes an integral elastic portion such that when the elastic portion is in a first, upstretched state, the flexible wrap member includes an unfastened length less than a fastening length of the flexible wrap member required to extend from an attachment point at a rear side of the seat back around an outer perimeter of the upper and lower covers and to front side of the seat back for attachment via the fastening arrangement. In one exemplary implementation, each flexible wrap member is configured to be elongated via the integral elastic portion from the first state to a second state having the fastening length for removably attaching the flexible wrap amber at the second end to the front side of the seat back in the fastening position. In this exemplary implementation, each flexible wrap member with the integral elastic portion is configured to, when unfastened from the front side of the seat back, retract from the fastened length to an unfastened length thereby exposing an opening to the access space.

In some implementations, each lower side cover includes an upwardly extending rear leg portion that extends behind the seat anchor adjacent the rear side of the seat back and terminates below the upper cover, the flexible wrap member extending over the rear leg portion, which aids the flexible wrap member in conforming to the shape of the upper and lower covers.

In some implementations, the seat back includes an outer covering material and wherein the flexible wrap member is constructed of a material that is the same as the outer covering material.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
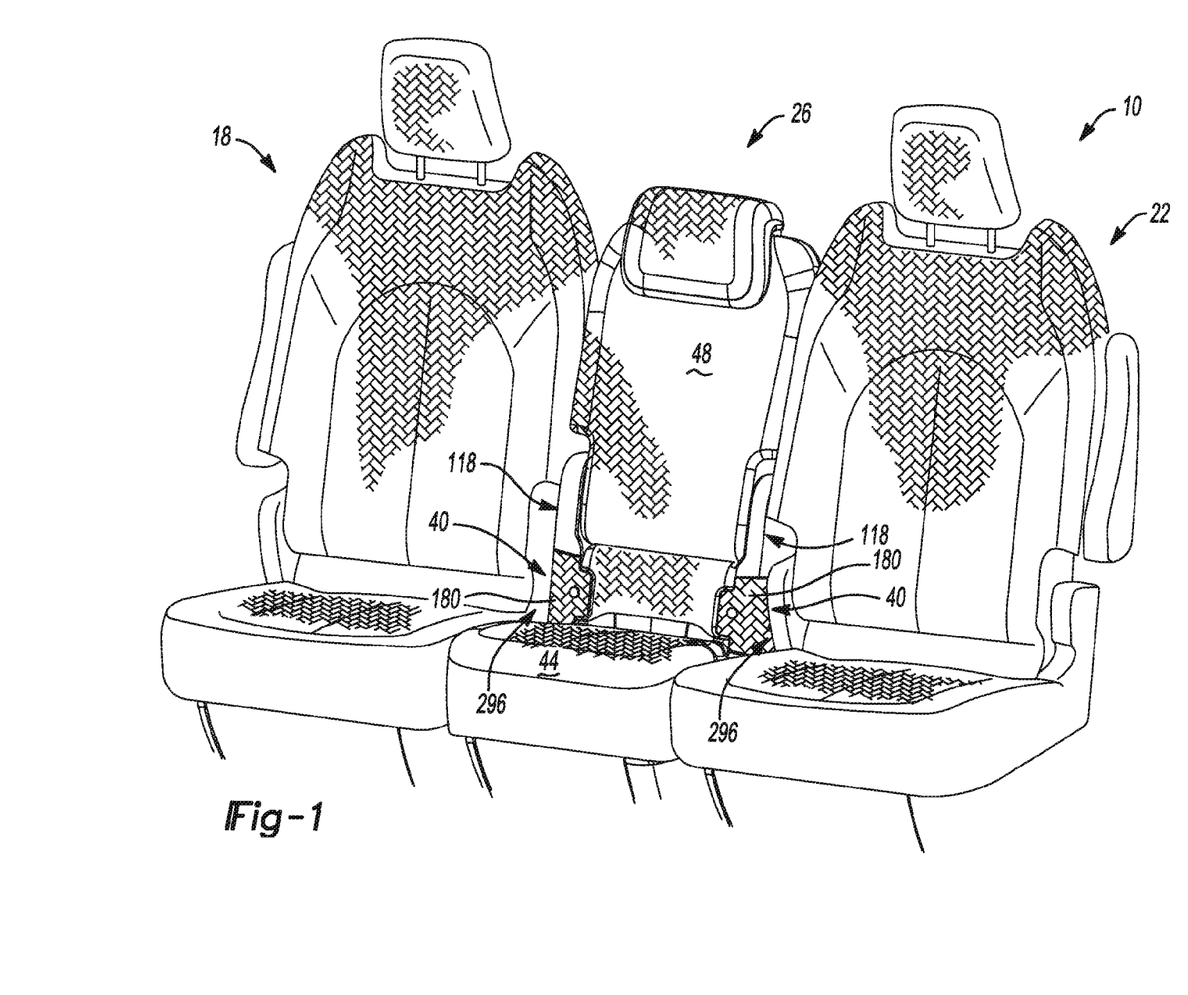
FIG. 1 is a perspective view of an exemplary second row of vehicle seats according to the principles of the present disclosure.

With initial reference to FIG. 1, an exemplary second row of seating for a vehicle, such as a minivan, SUV, crossover, etc., is shown and generally identified at reference numeral 10. As shown, the second row of seating 10 is positioned behind a first row of seating and in front of a third row of seating, and includes an outboard first lateral side seat 18, a second outboard lateral side seat 22, and a center seat 26 removably positioned between outboard seats 18, 22.

As will be discussed in greater detail below, the center seat 26 includes a pair of seat anchors 30A, 30B (collectively, anchors "30") extending from lateral sides of the center seat 26, where each seat anchor 30A, 30B is covered or substantially covered by a flexible, partially removable anchor cover or wrap arrangement 40 that remains attached to the center seat 26 in a first (fastened) position covering or substantially covering each anchor 30A, 30B, and in a second (unfastened) position providing access to each anchor. The outboard lateral side seats 18, 22 together with the center seat 26 positioned as shown provide a bench seating arrangement for the associated vehicle. The center seat 26 is optionally removable and/or optionally stowable in a receptacle in a floor in a manner similar to or the same as known for existing stowable seat arrangements.

With continued reference to FIG. 1 and additional reference to FIGS. 2-5, the center seat 26 includes a seat bottom 44, a seat back 48 extending upright relative to the seat bottom 44 and the pair of seat anchors 30A, 30B extending outwardly from respective lateral sides 52A, 52B (collectively, lateral sides "52") of the seat back 48. The seat anchors 30 are also known as or can be referred to as part of a LATCH (lower anchors and tethers for children) system, such as in the United States, as well as isofix anchors and/or LUAS (lower universal anchorage system). As shown in the various figures, the center seat 26 is narrower than the outboard seats 18, 22 and positioned between the same such that outboard lateral sides of the overall center seat 26 are in contact with or substantially in contact with adjacent inboard lateral sides of the outboard seats 18, 22.

In the exemplary implementation illustrated, the seat bottom 44 includes a forward portion 60 and an opposed rearward portion 64 adjacent the seat back 48. The seat back 48 includes a lower portion 68 adjacent the seat bottom rearward portion 64 and an opposed upper portion 72. In this exemplary implementation, the rearward portion 64 of seat bottom 44 includes at least one recessed portion 76 providing access to a seat belt receptacle, for example. In one exemplary implementation, the recessed portion 76 extends from an upper surface 80 of seat bottom 44 only partially toward an opposed bottom surface 84. The seat back 48 includes a recessed portion or necked in area 90 on each lateral side 52 thereof, as shown for example in FIG. 2. The recessed portions 90 result in the seat back 48 having a narrower lateral width 102 than a width 106 of the seat back 48 above the recessed portions 90.

Figure 2:
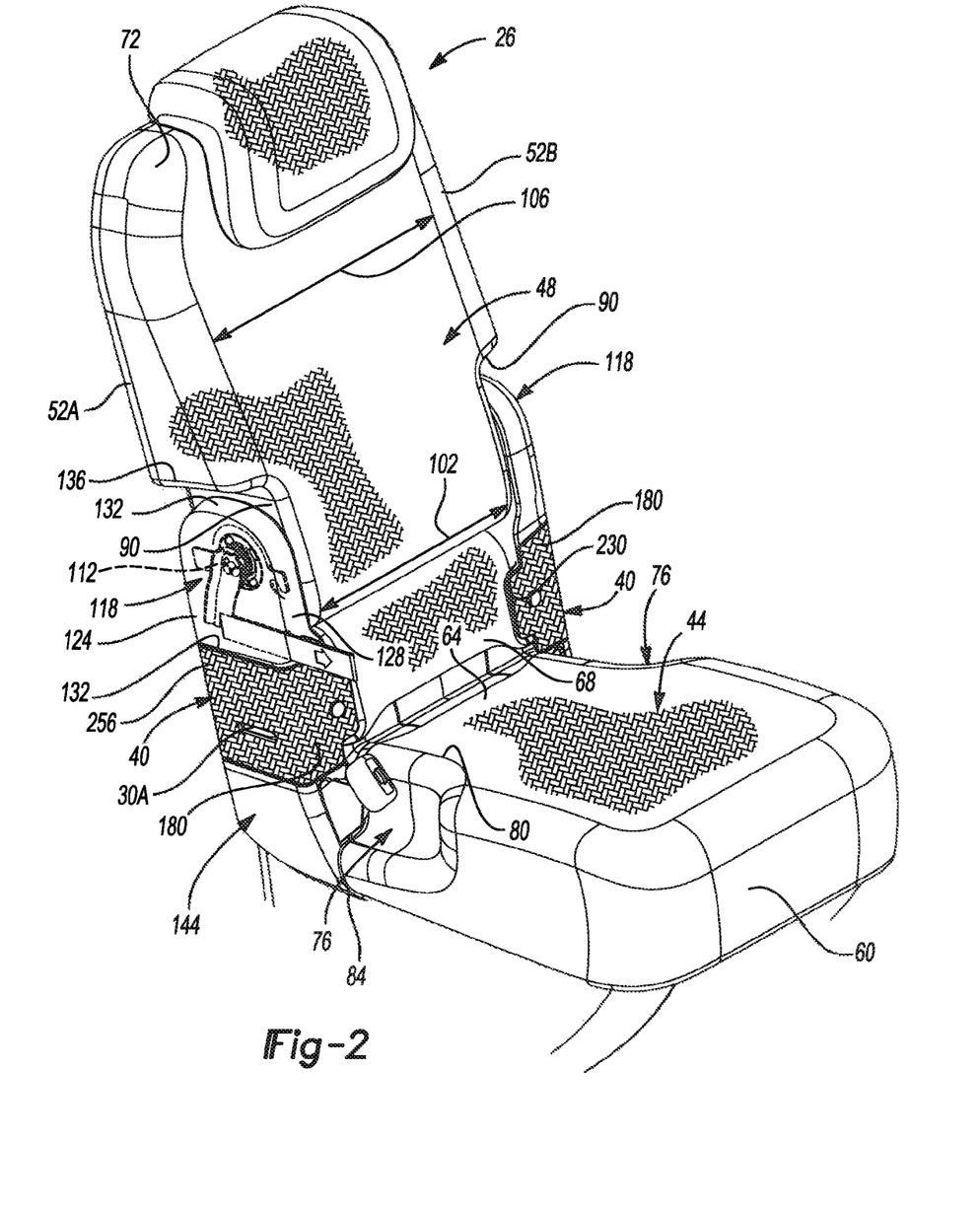
FIG. 2 is a perspective view of an exemplary center seat of the second row of seats of FIG. 1 according to the principles of the present disclosure.
Figures 3, 4:
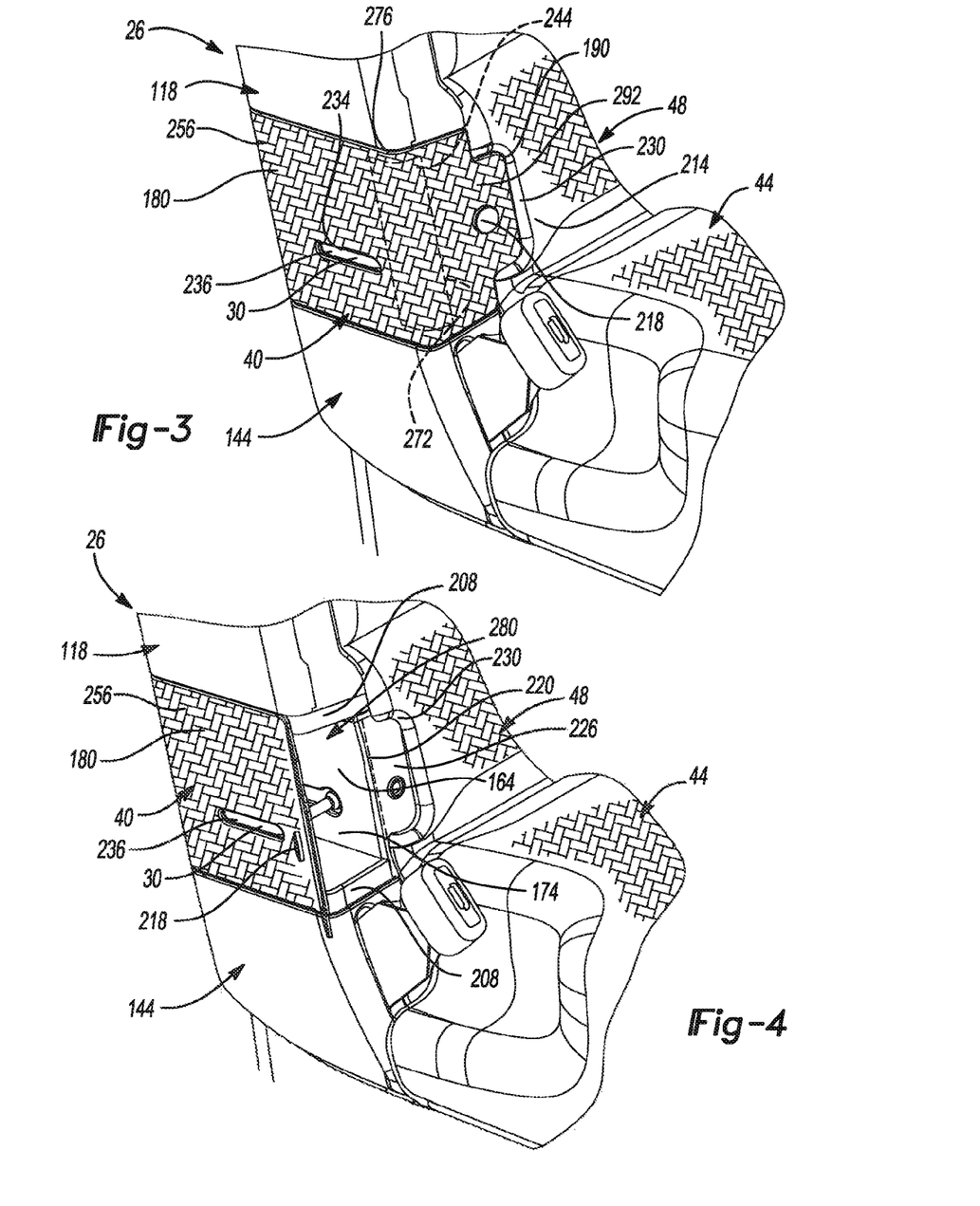
FIG. 3 is an enlarged view of a flexible, partially removable seat anchor wrap arrangement of FIG. 2 shown in a fastened position according to the principles of the present disclosure.
FIG. 4 is a view of the flexible, partially removable seat anchor wrap arrangement of FIG. 2 shown in an exemplary unfastened position according to the principles of the present disclosure.

Positioned in the recessed portions 90 are the seat anchors 30A, 30B (discussed above) as well as a recliner mechanism 112 that facilitates reclining forward/rearward and optionally also folding forward of seat back 48. The seat anchors 30 extend laterally outward from the lateral sides 52 of recessed portions 90 and, in the exemplary implementation illustrated, are formed in a U-shaped manner (FIG. 7), although other shapes are contemplated. A pair of upper covers or recliner covers 118 are positioned in the recessed portions 90 for covering the recliner mechanism 112, as also can be seen in FIG. 2. In the exemplary implementation illustrated, the recliner covers 118 cover what would be otherwise exposed components of the recliner mechanism 112 and terminate above and in spaced relation to the anchors 30A, 30B, as can be seen in FIG. 4. In this regard, the recliner covers 118 include an outer lateral surface 124, sidewalls 128 and upper and lower ends 132 that together essentially form a cap over the recliner mechanism 112 that extends from an upper portion or end 136 of recessed portion 90 toward the seat bottom 44 and terminating above and in spaced relation to the respective anchors 30.

Figure 7:
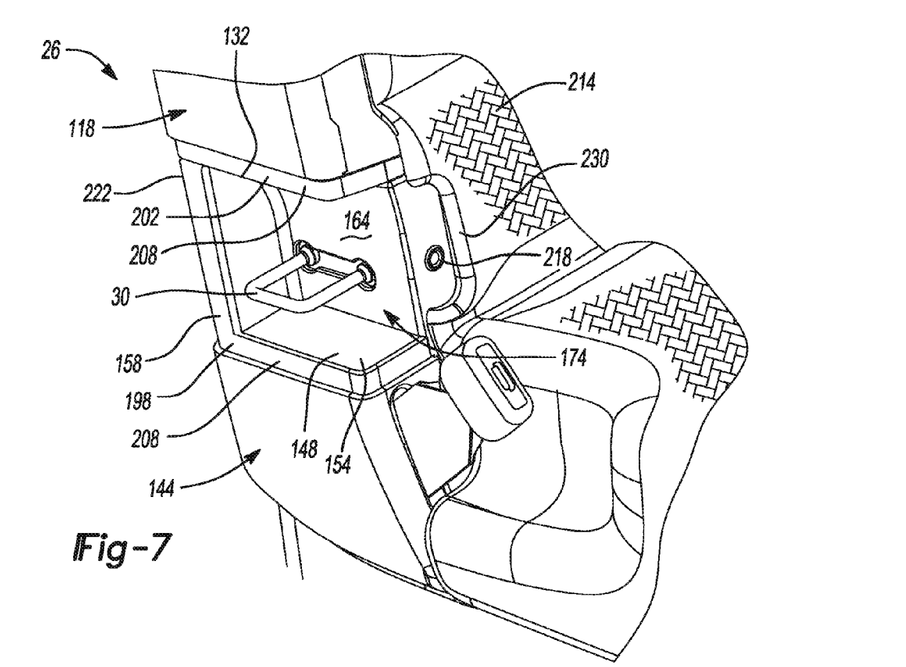
FIG. 7 is a perspective view of the center seat of FIG. 2 shown without the partially removable seat anchor wrap arrangement for illustration purposes and according to the principles of the present disclosure.

Lower side covers 144 are positioned at or about a lower portion of the recessed portions 90 and are utilized, at least on one lateral side 52 of the center seat 26, for covering a portion of the seat belt receptacle. As can be seen in at least FIG. 7, the lower side covers 144 include an upper portion 148 that terminates beneath and in spaced relation to the seat anchors 30. In one exemplary implementation, the upper portion 148 includes an upper end of the side covers 144 such that the entire side cover terminates beneath and in spaced relation to the seat anchors 30. In another exemplary implementation and as shown in FIG. 7, the upper portion 148 includes a first upper portion 154 that terminates beneath the anchors 30 as discussed above, and a second portion or leg 158 that extends upwardly behind the anchors 30 and toward the recliner cover 118.

In another exemplary implementation, the side covers 144 include a cover panel or layer 164 designed to contact or substantially contact adjacent seat structure, such as frame components, to cover the same. In the above implementations, the seat frame components are optionally covered by soft trim, such as the seat back and/or bottom cover material, typically fabric or leather or a combination thereof. In this implementation, the cover panel 164 is a layer or sheet of plastic extending from the first upper portion 154 of the side cover 144 to a height of the rear leg portion 158, while remaining below and separate from the recliner cover 118.

In each of the above configurations of the lower side covers 144, an uppermost end of the lower side covers 144 terminates adjacent to and/or in spaced relation to the lower end 132 of the recliner covers 118 as the side covers 144 are separate discreet cover components of center seat 26. Each configuration of the side covers 144 together with the respective recliner covers 118 provides for an access area or gap 174 around the anchors 30 to facilitate securing a child seat tether or the like thereto.

The partially removable flexible anchor wrap arrangement 40 along with its function and operation will now be discussed in greater detail. In one exemplary implementation and as briefly discussed above, each of the partially removable flexible anchor wrap arrangements 40 is positioned around or wrapped around the lateral sides 52 of the center seat 26 so as to extend about the respective anchors 30 and cover the access space or area 174 around the anchors 30 and between the recliner covers 118 and side covers 144. In one exemplary implementation, each of the partially removable flexible anchor wrap arrangements 40 is positioned around or wrapped around the lateral sides 52 of the center seat 26 so as to cover or substantially cover the respective anchors 30 and cover the access space or area 174 around the anchors 30 and between the recliner covers 118 and side covers 144. In the exemplary implementation illustrated, the flexible anchor wrap arrangement 40 includes at least one piece of flexible material, such as the fabric material or leather or the like covering at least a portion of the seat back 48 and/or seat bottom 44, in the form of a flexible fabric or soft trim wrap 180. It will be appreciated that other flexible materials, such as flexible reinforced and unreinforced plastic may be utilized when having the capability to conform or substantially conform to the shape of the covers 118, 144, as discussed below in greater detail.

Figure 8:
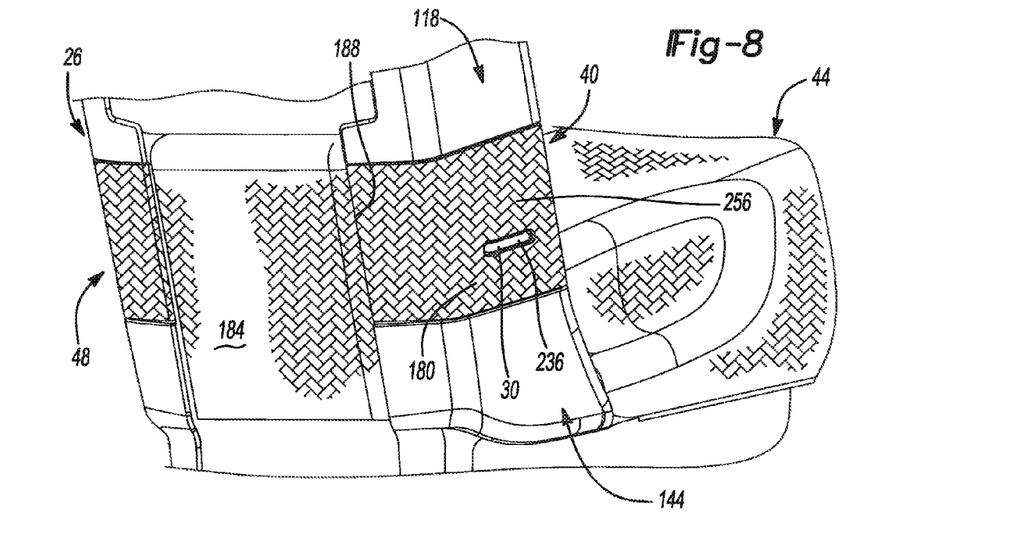
FIG. 8 is a partial rear perspective view of the center seat of FIG. 2 according to the principles of the present disclosure.
Figure 9:
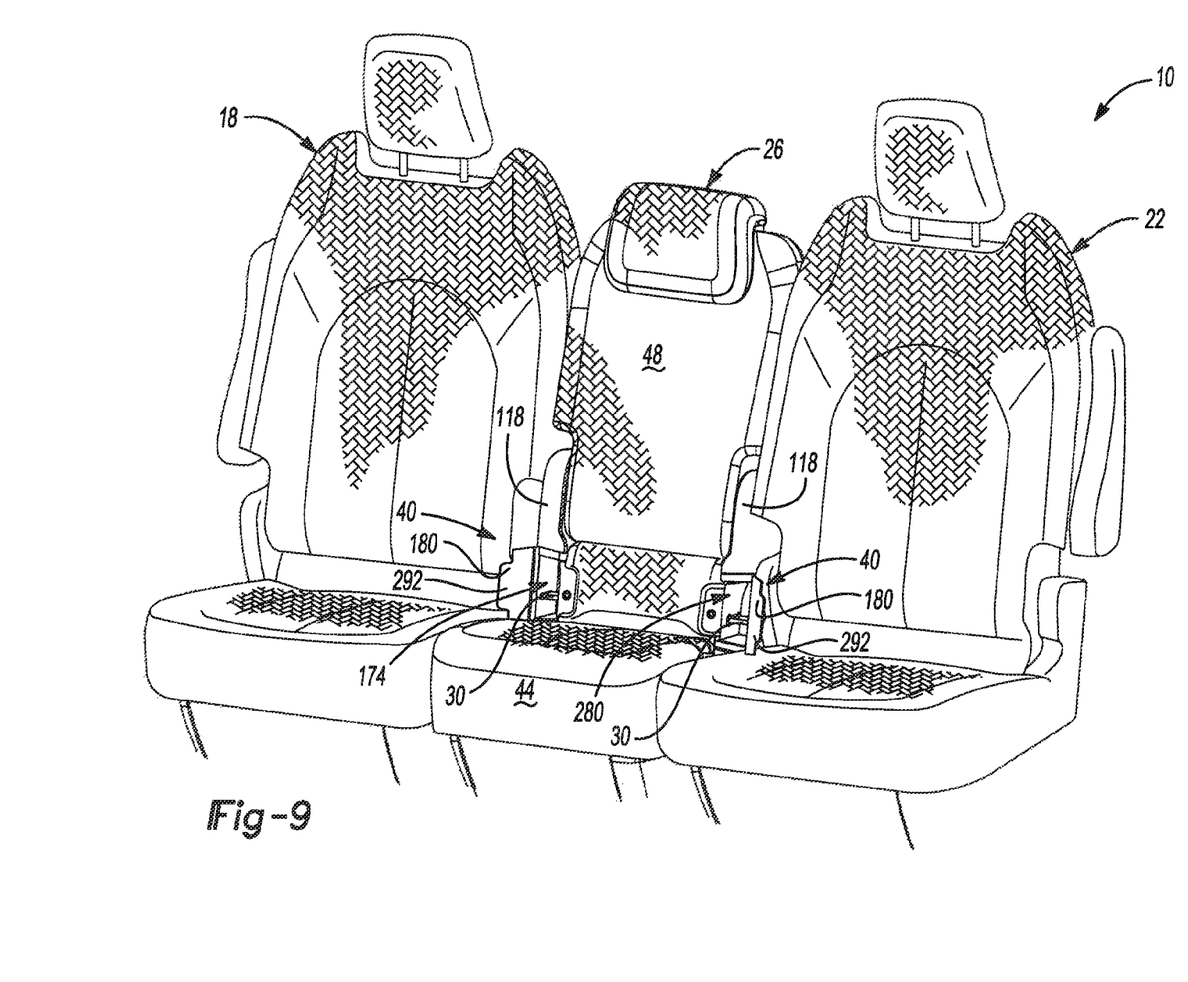
FIG. 9 is a perspective view of the exemplary second row of vehicle seats of FIG. 1 illustrating one implementation of the flexible partially removable cover arrangements in an exemplary unfastened position according to the principles of the present disclosure.

In one exemplary implementation, each flexible wrap 180 is attached to a rear side 184 (FIG. 8) of the seat back 48 at a first or rear end 188 and is wrapped around a respective portion of the recliner and side covers 118, 144 and is removably secured to the center seat 26 adjacent to or on a front side of the seat back 48 at a second end 190. In this exemplary implementation, the flexible wrap 180 is supported at a rear side/portion by the side cover upwardly extending leg 158, along the outboard lateral surfaces 124 by an upper portion 198 of the side cover 144 and a lower portion 202 of the recliner cover 118 so as to conform to or take the general shape of the contacting portions of the side cover 144 and recliner cover 118, as shown in FIG. 3 with reference to FIG. 7.

Figure 5:
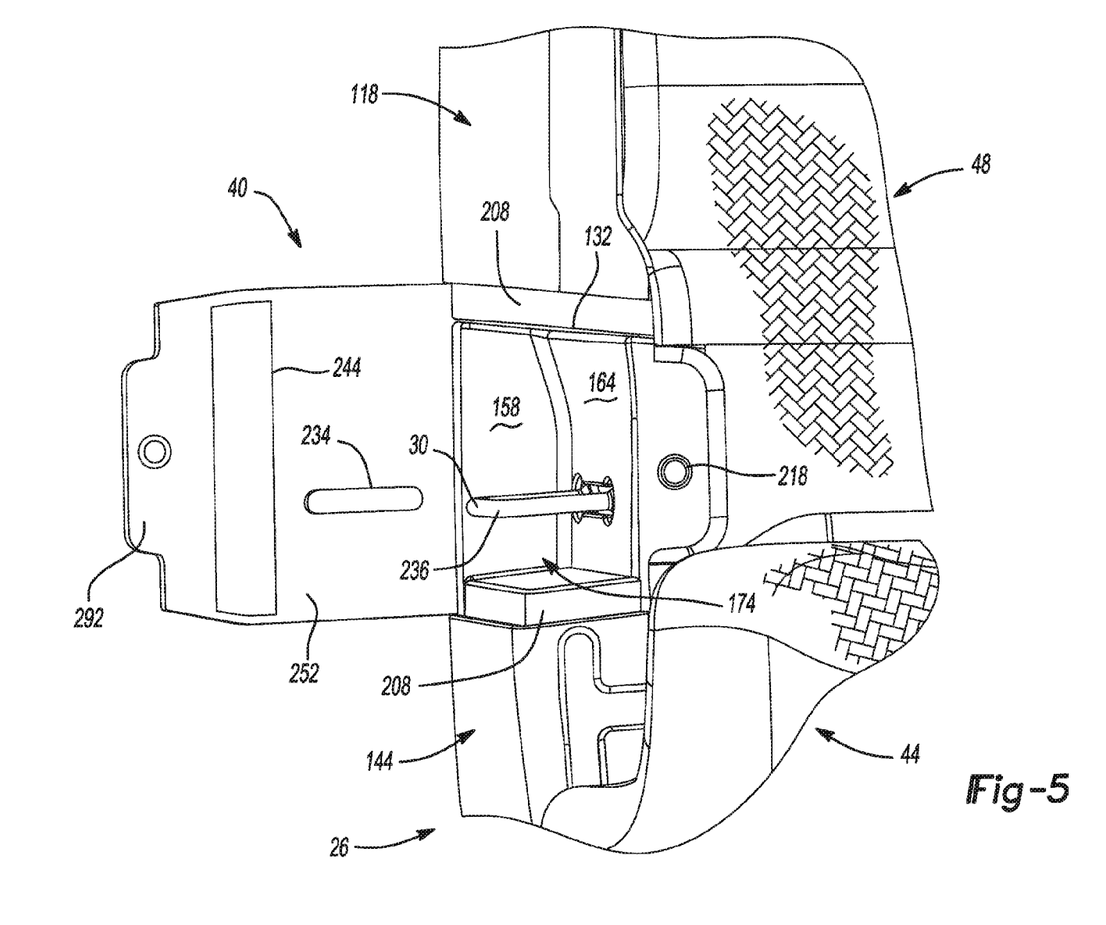
FIG. 5 is a view of the flexible, partially removable seat anchor wrap arrangement of FIG. 2 shown in another exemplary unfastened position and with an optional flexible support member according to the principles of the present disclosure.

The upper portion 198 of the side cover 144 and the lower portion 202 of the recliner cover 118 where upper and lower portions of the flexible wrap 180 overlap include, in one exemplary implementation, a recessed portion 208 for receiving the flexible wrap 180, as shown for example in FIGS. 4, 5 and 7. With this arrangement, the flexible wrap 180, when positioned around/over the recliner and side covers 118, 144 and over/about the anchors 30 as shown in FIGS. 2 and 3, overlaps recessed cover portions 208 such that the covers 118, 144 provide support for the flexible wrap 180. in one exemplary implementation, the flexible wrap member 180 is substantially flush with or substantially co-planar with outer adjacent surfaces of the upper and lower covers 118, 144. In one exemplary implementation, the flexible wrap member 180, when in a fastened positioned over the covers 118, 144 around the lateral sides 52, the flexible wrap member 180 extends around an outer perimeter of the upper and lower covers 118, 144 from the rear side of the set back to the front side of the seat back.

In one exemplary implementation, the flexible wrap 180 is coupled to the rear side 184 of seat back 48 and to a front or seating side 214 of the seat back 48 such that the flexible wrap contacts the covers 118, 144 but is not attached or fixed to the covers 118, 144. In another exemplary implementation, the first end 188 of the fabric wrap is attached to a rear side 222 (FIG. 7) of the upwardly extending leg 158.

In one exemplary implementation, the attachment at the second end 190 can be via a button, snap or the like 218 to center seat 26 frame structure that is separate from side cover 144, which is indicated in FIG. 4 as being to the inboard side of line 220. In one exemplary implementation, the flexible wrap 180 is removably attached at its second end 190 to a laterally extending portion 226 of the panel 164, which in this implementation is indicated as extending to the inboard side of line 220 in FIG. 4. In this exemplary implementation, the seat back 48 includes an optional recess 230 for receiving the second end 190 of the flexible wrap 180 so as to be flush or recessed from a seating surface of the front side of seat back 48.

As is seen in the various figures, the flexible wrap 180 includes an optional aperture or opening 234 formed therein and configured to align with an outer end 236 of anchors 30 such that the outer ends 236 of anchors 30 are partially exposed and not covered. In this regard, this optional configuration provides a visual cue to a user that there is an anchor 30A, 30B behind the flexible wrap 180, while also advantageously covering the space 174 and concealing remaining portions of the anchors 30. Further, to the extent the lateral sides 52 of the center seat 26 contact the adjacent seats 18, 22 during movement thereof, the anchors will not force the respective flexible wraps 180 against the adjacent lateral sides of seats 18, 22, which will prevent a wear mark of the like from forming on the wrap 180.

In addition, in an exemplary implementation, the flexible wrap 180 includes an integrated flexible support member or members 244 configured to aid in having the flexible wrap 180 conform to and maintain the outer shape or profile of the adjacent separate covers 118, 144. In one exemplary implementation, the flexible support member 244 is integrated inside of inner and outer layers 252, 256 (FIGS. 3 and 5) of the flexible wrap 180, such as between the layers. In another exemplary implementation, the flexible support member 244 forms a portion of an internal side 260 of the flexible wrap opposite the external side 264 (FIG. 5). In either exemplary implementation, the flexible support member 244 includes a height substantially similar to a height of the flexible wrap 180 such that upper and lower portions of the flexible support member 244 overlap the covers 118, 144 in the recessed areas 208 and are supported by the same. In one exemplary implementation, the optional flexible support member 244 is coupled to each of the flexible wraps 180 such that a forward edge 272 aligns with or partially extends around a corner 276 of the covers 118, 144 so as to provide support for the wrap 180 in this area and assist the wrap 180 in conforming to the outer shape of the covers 118, 144.

In operation, the flexible wrap 180 can be positioned around the covers 118, 144 and removably fastened at its second end 190 to the front of center seat 26 (via fastening arrangement 218) when the seat anchors 30 are not needed or in use. When access to the anchors 30 is desired, such as to attach a child car seat, each flexible wrap 180 is unfastened at its second end 190 thereby exposing an access opening 280 to the space 174 around the respective anchors 30 as well as the anchors. It will be appreciated that while the flexible wrap 180 is shown only partially opened in FIG. 4 with resultant access opening 280, the flexible wrap 180 can be opened or unwrapped as much as desired, such as in FIG. 5, to provide varying amounts of access or access openings 280 to the anchors 30 and the access space 174 therearound. Advantageously, in an open, unfastened position, the flexible wrap 180 remains attached to the center seat 26 and thus will not present a risk of being lost and does not need to be separately stored. In addition and as generally shown in FIG. 6, the adjacent inboard sides 284 of outboard seats 18, 22 can aid to maintain the flexible wrap 180 in an open or unfastened position while also adjacent to the covers 118, 144. When the anchors 30 are no longer in use, the flexible wrap 180 can be fastened via fastening arrangement 218 to substantially cover the anchors 30 and cover the space 174, as shown for example in FIG. 3.

Figure 6A:
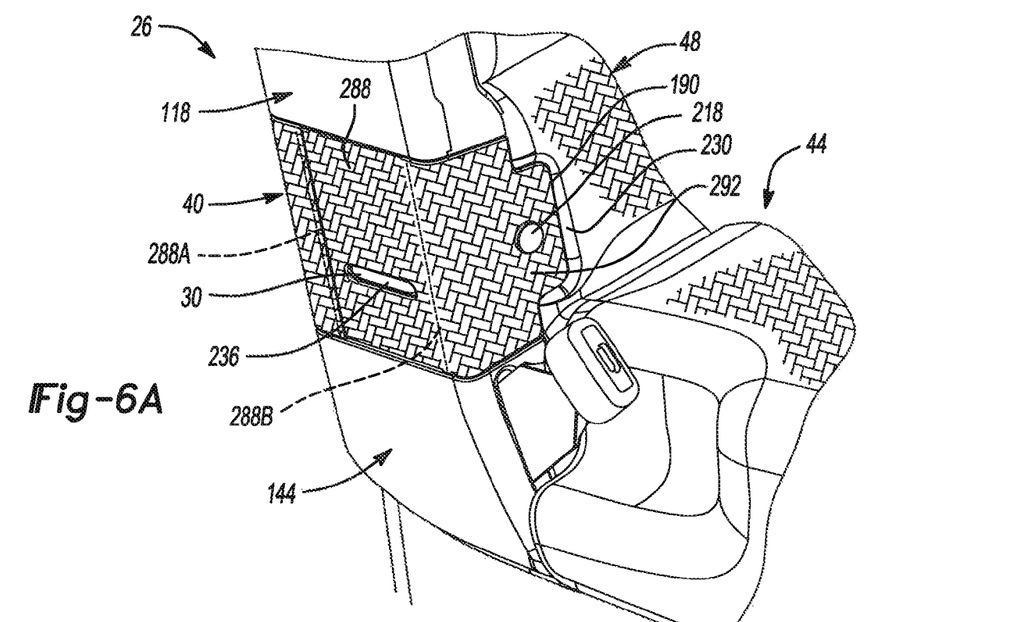
FIG. 6A is a view of the flexible, partially removable seat anchor wrap arrangement of FIG. 2 shown in an exemplary fastened position and with an elastic member or portion according to the principles of the present disclosure.
Figure 6B:
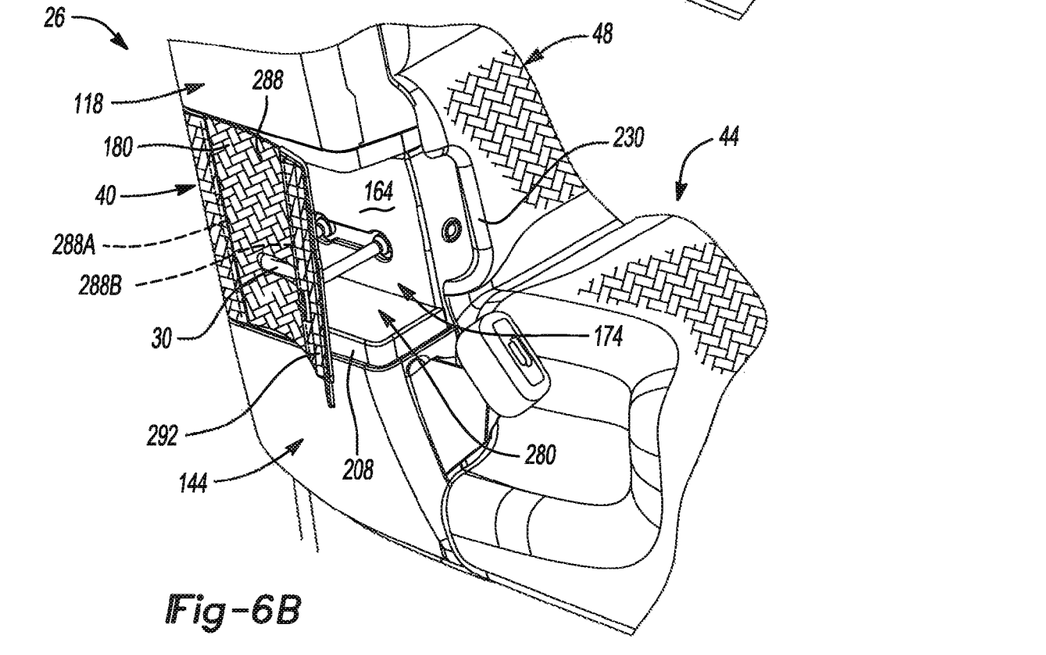
FIG. 6B is a view of the flexible, partially removable seat anchor wrap arrangement of FIG. 6A shown in an exemplary unfastened position according to the principles of the present disclosure.

In an exemplary implementation, the flexible wrap 180 includes an elastic or length varying member or portion 288, as shown in FIGS. 6A and 6B. The elastic portion 288 can include the same or substantially the same external appearance as the external appearance of the remaining areas of the flexible wrap 180. In the exemplary implementation illustrated, the elastic member or portion 288 extends along and/or forms a surface of the flexible wrap member 180 aligned with the outboard lateral surfaces 124 of the covers 118, 144. In this regard, the elastic member/portion includes first and second ends 288A, 288B, as shown in FIGS. 6A and 6B.

Figure 10:
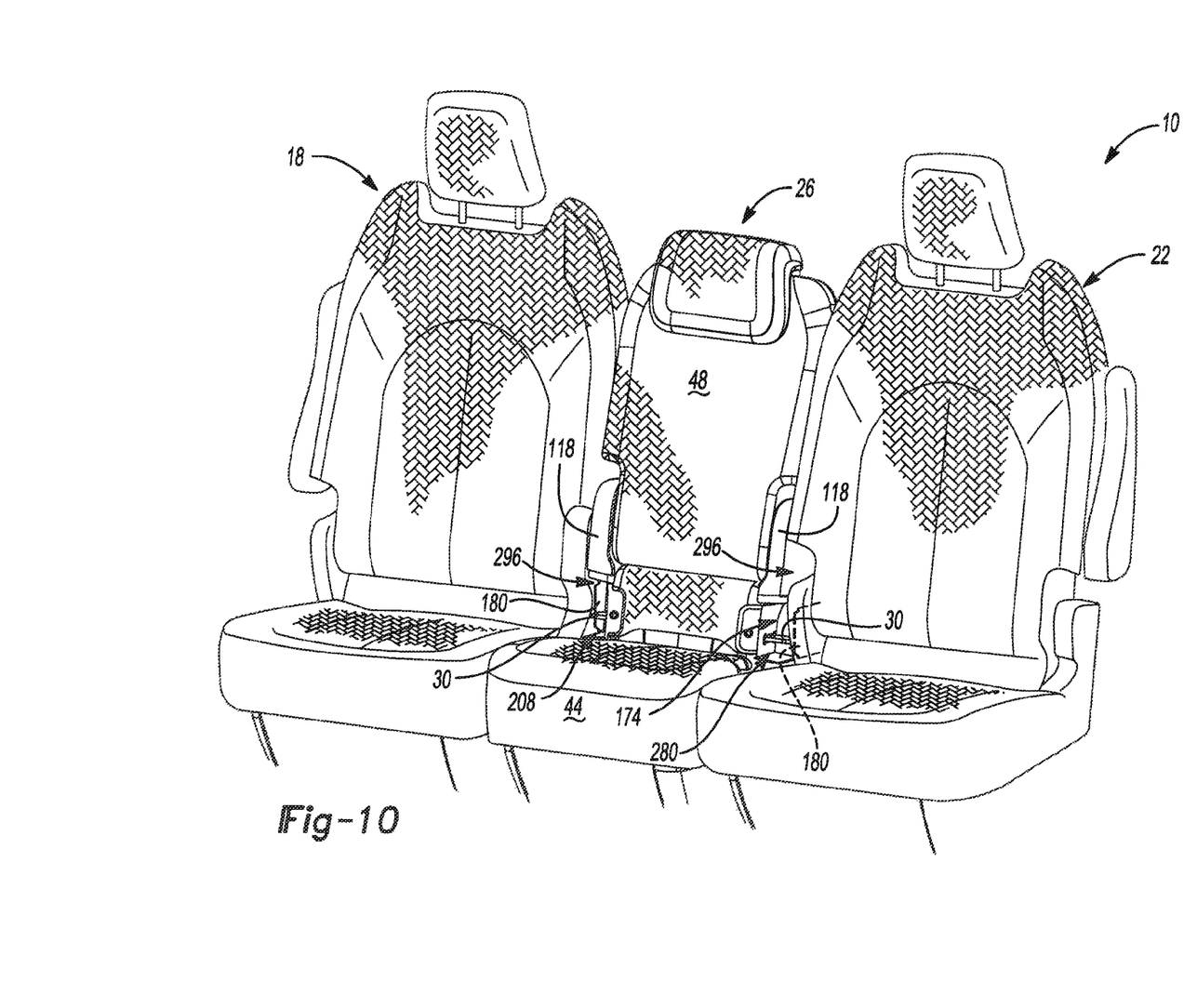
FIG. 10 is a perspective view of the exemplary second row of vehicle seats of FIG. 1 illustrating one implementation of the flexible partially removable cover arrangements in an exemplary unfastened position according to the principles of the present disclosure.

The elastic member 288 is configured to provide an elasticity to the flexible wrap 180 such that it is stretched when wrapped around the covers 118, 144 and removably attached in the fastened position at the second end 190 in the exemplary manner discussed above. In other words, in an unfastened state (FIG. 6B), the flexible wrap 180 includes an unstretched length between ends 288A, 288B that is less than required to wrap around the covers 118, 144 from the rear side 184 of the seat back 48 to the fastening arrangement 218 on the front side thereof. As a result, when the flexible wrap 180 with elastic portion/member 288 is unfastened, as shown in FIG. 6B, it automatically pulls back or retracts via the elastic portion 288 returning to an upstretched state and thereby exposes access opening 280 without having to pivot over or open a front portion 292 (or additional portions) of flexible wrap 180. In addition and as shown in FIG. 10 with reference to FIGS. 6A and 6B, the flexible wrap 180 of this implementation can be advantageously retracted to an area 296 between the lateral sides 52 of the center seat 26 and adjacent outboard seats 18, 22 when unfastened, thereby providing for the second end 190 and/or front portion 292 to not protrude outwardly beyond or substantially beyond the front side of center seat 26.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A seat for a vehicle, the seat comprising:
    a seat base;
    a seat back including opposed outboard lateral sides;
    a pair of seat anchors outwardly extending from the respective lateral sides of the seat back;
    an upper side cover positioned about each lateral side of the seat back above the seat anchor and in spaced relation thereto;
    a discrete lower side cover positioned about each lateral side of the seat back below the respective seat anchor and in spaced relation thereto, thereby providing an access space above and below the seat anchor; and
    a pair of flexible wrap members extending, in a fastened position, about the respective seat anchors and around a portion of the respective upper and lower side covers to cover the access spaces, each flexible wrap member non-removably attached at a first end to the seat proximate a rear side of the seat back and removably coupled via a fastening arrangement at a second opposed end to a front side of the seat proximate a front side of the seat back;
    wherein, in the fastened position, each flexible wrap member is configured to substantially conform to an outer perimeter shape of the respective upper and lower side covers and, in an unfastened position, be at least partially removed from contact with the respective upper and lower side covers thereby providing access to the respective seat anchor via the uncovered access space.

2. The vehicle seat of claim 1, further comprising a recliner mechanism providing for the seat back to move relative to the seat base;
    wherein the upper side covers comprise recliner covers positioned over the recliner mechanism.

3. The vehicle seat of claim 1, wherein the upper side cover and the lower side cover comprise plastic covers; and
    wherein the flexible wrap members comprise one of a fabric wrap member and a leather wrap member consistent with a seat material covering at least a portion of the seat back.

4. The vehicle seat of claim 1, wherein the flexible wrap members each include an aperture aligned with an outer side of the respective seat anchors when the flexible wrap member is in the fastened position.

5. The vehicle seat of claim 4, wherein each aperture is sized and shaped to match a size and shape of the outer sides of the seat anchors.

6. The vehicle seat of claim 1, wherein each flexible wrap member is non-removably attached at the first end to a back side of the seat back opposed to a front side of the seat back, and at the second end to the front side of the seat back via the fastening arrangement.

7. The vehicle seat of claim 6, wherein the front side of the seat back includes a recess where a first mating member of the fastening arrangement is positioned; and wherein the second end of the flexible wrap member includes a second mating member of the fastening arrangement for removably attaching the second end of the flexible wrap member to the first mating member.

8. The vehicle seat of claim 1, wherein a lower end of the upper covers and an upper end of the lower covers include a recessed portion constructed to receive and support the flexible wrap member in the fastened position and provide for outer surfaces of the upper cover, flexible wrap member and lower cover to be substantially coplanar on each lateral side of the seat.

9. The vehicle seat of claim 8, wherein each lower side cover includes an upwardly extending rear leg portion that extends behind the seat anchor adjacent the rear side of the seat back and terminates below the upper cover, the flexible wrap member extending over the rear leg portion, which aids the flexible wrap member in conforming to the shape of the upper and lower covers.

10. The vehicle seat of claim 8, wherein each flexible wrap member comprises a discrete flexible support member coupled to the flexible wrap member and configured to aid the flexible wrap member in conforming to and maintaining the shape of the upper and lower covers.

11. The vehicle seat of claim 10, wherein the flexible support member includes upper and lower portions that overlap the recessed portions of the upper and lower covers so as to provide support for the respective flexible wrap member when in the fastened position.

12. The vehicle seat of claim 1, wherein each flexible wrap member includes an integral elastic portion such that when the elastic portion is in a first, unstretched state, the flexible wrap member includes an unfastened length less than a fastening length required to extend from an attachment point at a rear side of the seat back around an outer perimeter of the upper and lower covers and to the front side of the seat back for attachment via the fastening arrangement.

13. The vehicle seat of claim 12, wherein each flexible wrap member is configured to be elongated via the integral elastic portion from the first state to a second state having the fastening length for removably attaching the flexible wrap amber at the second end to the front side of the seat back in the fastening position.

14. The vehicle seat of claim 13, wherein each flexible wrap member with the integral elastic portion is configured to, when unfastened from the front side of the seat back, retract from the fastening length to the unfastened length thereby exposing an opening to the access space.

15. The vehicle seat of claim 1, wherein the flexible wrap members, in the fastened position, extend around the respective upper and lower covers and the respective seat anchor to cover the respective access spaces and anchors.

16. The vehicle seat of claim 1, wherein the seat back includes an outer covering material and wherein the flexible wrap member is constructed of a material that is the same as the outer covering material.

* * * * *